United States Patent
Miller et al.

(10) Patent No.: US 12,140,086 B2
(45) Date of Patent: Nov. 12, 2024

(54) TRANSIENT GASEOUS FUEL FLOW SCHEDULING

(71) Applicant: Pratt & Whitney Canada Corp., Longueuil (CA)

(72) Inventors: Todd Miller, Toronto (CA); Thomas Dillon, Etobicoke (CA); Ezzat Meshkinfam, Mississauga (CA); Lu Xuening, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 122 days.

(21) Appl. No.: 17/393,386

(22) Filed: Aug. 3, 2021

(65) Prior Publication Data
US 2023/0043433 A1 Feb. 9, 2023

(51) Int. Cl.
*F02C 9/26* (2006.01)
*F02C 6/20* (2006.01)

(52) U.S. Cl.
CPC ............... *F02C 9/26* (2013.01); *F02C 6/20* (2013.01); *F05D 2220/323* (2013.01); *F05D 2270/30* (2013.01)

(58) Field of Classification Search
CPC ....................................................... F02C 9/26
See application file for complete search history.

(56) References Cited

U.S. PATENT DOCUMENTS

| | | |
|---|---|---|
| 6,357,219 B1 | 3/2002 | Dudd, Jr. et al. |
| 2010/0280731 A1 | 11/2010 | Snider |
| 2011/0094238 A1 * | 4/2011 | Mosley .......... F02C 9/28 60/773 |
| 2014/0123663 A1 | 5/2014 | Ficklscherer |
| 2016/0076461 A1 | 3/2016 | Kawaii et al. |
| 2017/0051682 A1 | 2/2017 | Simmons et al. |
| 2017/0298839 A1 * | 10/2017 | Hill .................. F02C 7/228 |

FOREIGN PATENT DOCUMENTS

| | | |
|---|---|---|
| CA | 2899875 A1 | 8/2014 |
| CN | 1052720 A | 7/1991 |
| CN | 105114187 A | 12/2015 |
| JP | 2010261440 A | 11/2010 |
| KR | 20040024854 A | 3/2004 |
| WO | WO-2009110900 A1 | 9/2009 |

OTHER PUBLICATIONS

European Patent Office, Communication re. extended European search report for European patent application No. 22188362 dated Mar. 4, 2023.

* cited by examiner

*Primary Examiner* — Scott J Walthour
(74) *Attorney, Agent, or Firm* — Norton Rose Fulbright Canada LLP

(57) ABSTRACT

In accordance with at least one aspect of this disclosure, there is provided a fuel control system for gaseous fuel in an aircraft. The system includes a control module operatively connected to a metering device in a fuel flow conduit, the control module operable to control the flow of fuel through the fuel flow conduit. The control module includes an input line operable to receive a command input indicative of a requested engine state. In embodiments, the control module includes a compressibility logic and machine readable instructions. The machine readable instruction can be configured to cause the control module to control the metering device to achieve the requested engine state based on a compressibility factor input from the compressibility logic.

8 Claims, 2 Drawing Sheets

TRANSIENT GASEOUS FUEL FLOW SCHEDULING

TECHNICAL FIELD

The present disclosure relates to fuel flow scheduling in aircraft.

BACKGROUND

There is an ongoing need in the aerospace industry for accurate control systems and methods for handling gaseous fuel over a range of operating conditions such as in aircraft operation.

SUMMARY

In accordance with at least one aspect of this disclosure, there is provided a fuel control system for gaseous fuel in an aircraft. The system includes a control module operatively connected to a metering device in a fuel flow conduit, the control module operable to control the flow of fuel through the fuel flow conduit. The control module includes an input line operable to receive a command input indicative of a requested engine state. In embodiments, the control module includes a compressibility logic and machine readable instructions. The machine readable instructions can be configured to cause the control module to control the metering device to achieve the requested engine state based on a compressibility factor input from the compressibility logic.

In embodiments, the control module further includes a predictive logic module, wherein the machine readable instructions are further operable to cause the control module to control the metering device to achieve the requested engine state based on the compressibility logic and results from the predictive logic module. In certain embodiments, the predictive logic module can be at least one of a proportional-integral, proportional-derivative, and/or proportional-integral-derivative (PID) controller.

In embodiments, the predictive logic module includes logic operable to output a predictive logic gain value to the control module. In certain such embodiments, the predictive logic gain value is dependent upon a proportional value representative of a measured engine speed, or a difference between the measured engine speed and a requested engine speed needed to achieve the requested engine state.

In certain embodiments, the predictive logic module includes logic operable to output a predictive logic gain value to the control module. In certain such embodiments, the predicative logic gain value is dependent upon a derivative value representative of a calculated derivative of measured engine speed.

In certain embodiments, the predictive logic module includes logic operable to output a predictive logic gain value to control the control module. In certain such embodiments, the predictive logic gain value is dependent upon an integral value representative of an integral of measured engine speed over a given period of time.

In embodiments, the system further includes a feedback logic. The feedback logic is configured to receive input indicative of an ambient and/or an engine condition, account for the ambient and/or engine condition in achieving the requested engine state, and output a feedback factor to the control module. The machine readable instructions can therefore be operable to cause the control module to control the metering device to achieve the requested engine state based on the feedback factor.

In embodiments, the engine condition includes at least one of engine start-up, increase in thrust, decrease in thrust, and/or change in engine power extraction. In embodiments, the compressibility logic includes a compressibility schedule, where a compressibility gain is correlated to a system pressure measurement and the compressibility logic is operable to output the compressibility gain as the compressibility factor to the control module.

In accordance with another aspect of this disclosure, there is provided a fuel control system for gaseous fuel in an aircraft. The system includes a control module operatively connected to a metering device in a fuel flow conduit for controlling flow of fuel through the fuel flow conduit. The control module includes an input line for receiving a command input indicative of a requested engine state. In certain embodiments, the control module includes a predictive logic module and machine readable instructions. In certain such embodiments, the machine readable instructions can be configured to cause the control module to control the metering device to achieve the requested engine state based on results from the predictive logic module.

In embodiments, the predictive control logic module is at least one of a: proportional-integral, proportional-derivative, and/or proportional-integral-derivative (PID) controller. In certain embodiments, the predictive logic module includes logic operable to output a predictive logic gain value to the control module. In certain such embodiments, the predictive logic gain value is dependent upon a proportional value representative of a measured engine speed, or a difference between the measured engine speed and a requested engine speed needed to achieve the requested engine state.

In certain embodiments, the predictive logic module includes logic operable to output a predictive logic gain value to the control module. In certain such embodiments, the predicative logic gain value is dependent upon a derivative value representative of a calculated derivative of measured engine speed.

In certain embodiments, the predictive logic module includes logic operable to output a predictive logic gain value to control the control module. In certain such embodiments, the predictive logic gain value is dependent upon an integral value representative of an integral of measured engine speed over a given period of time.

In embodiments, the system further includes a feedback logic. The feedback control logic can be operable to receive input indicative of an ambient and/or an engine condition, account for the ambient and/or engine condition in achieving the requested engine state, and output a feedback factor to the control module. The machine readable instructions can therefore be operable to cause the control module to control the metering device to achieve the requested engine state based on the feedback factor.

In accordance with yet another aspect of this disclosure, there is provided a method for controlling gaseous fuel in an aircraft. In embodiments, the method includes receiving a gaseous fuel flow request input, receiving a proportional-integral-derivative (PID) gain input, receiving a compressibility factor input, and controlling a metering device to achieve a commanded engine state based on the fuel flow request input, the PID gain input, and the compressibility factor input. In embodiments, the fuel flow request input is based on a requested engine state and feedback measurements.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
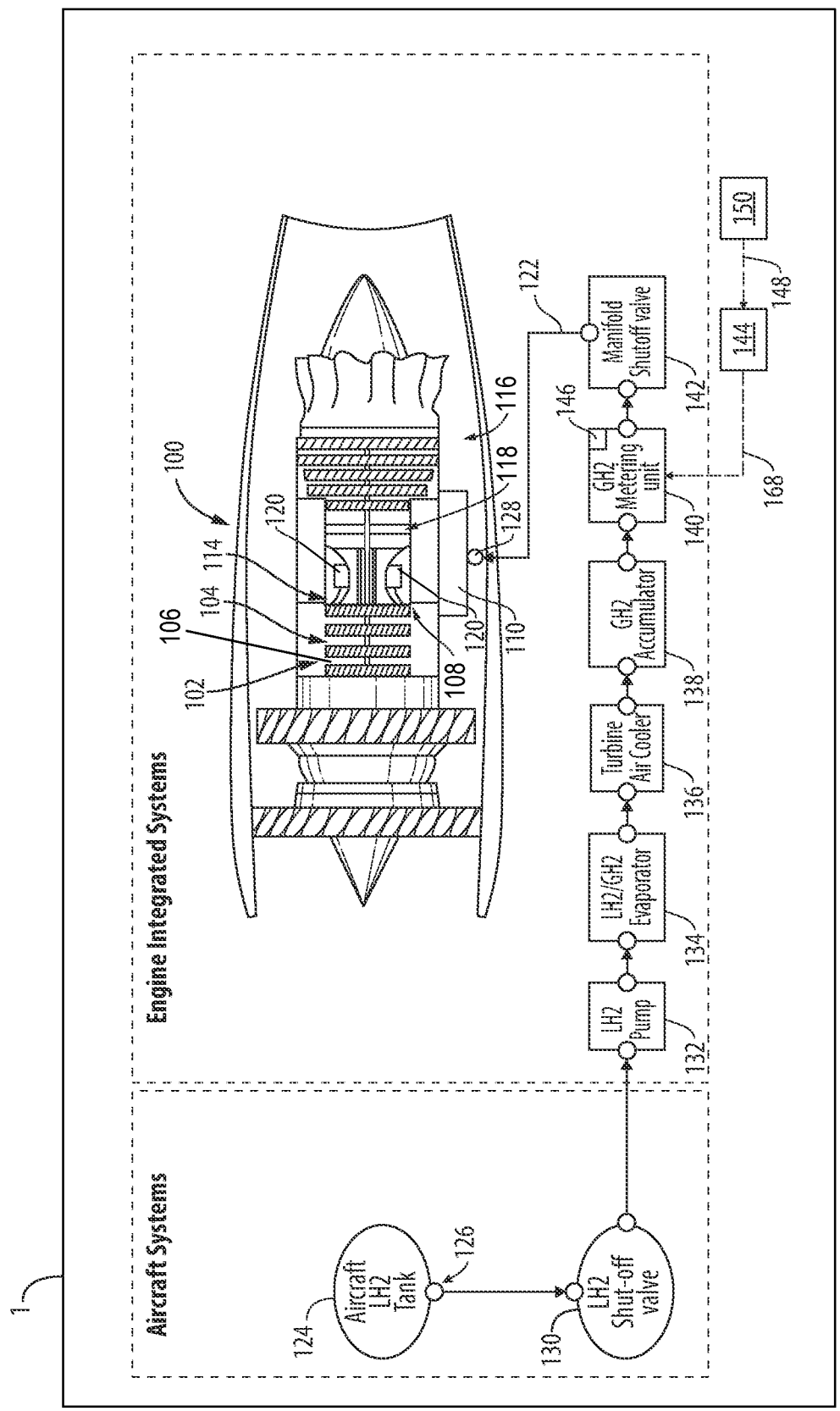
FIG. 1 is schematic cross-sectional side elevation view an aircraft engine in accordance with this disclosure, showing a plurality of fuel components connecting a fuel source to a combustor.
Figure 2:
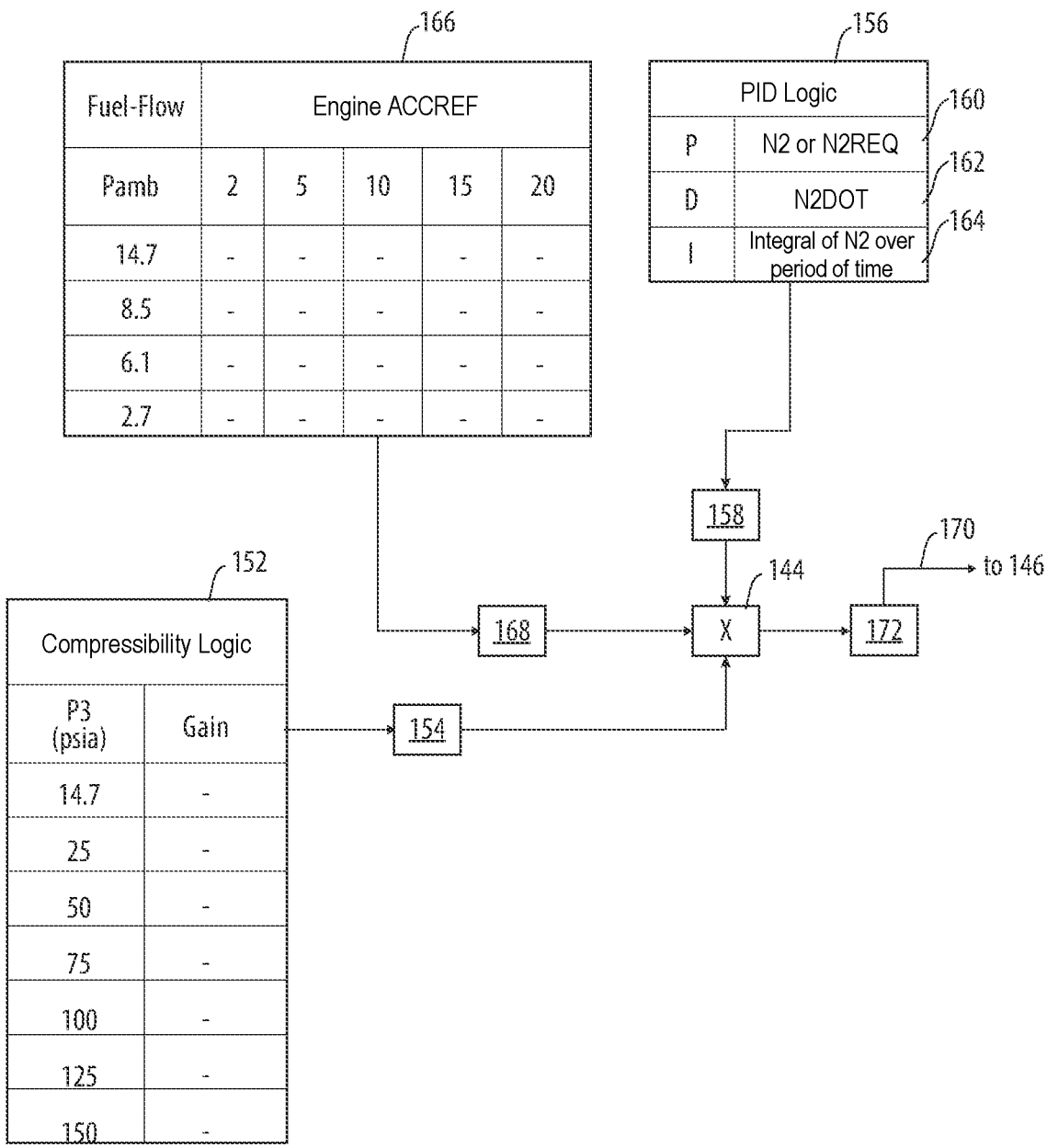
FIG. 2 is a schematic diagram of a fuel control system, showing control logic for the control of fuel from the fuel source to the combustor in the engine of FIG. 1.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. Certain embodiments described herein can be used to improve fuel metering and fuel scheduling for gaseous fuel, e.g. compressible fuels.

When accelerating an aircraft engine using a gaseous fuel, response-time may be sluggish since additional work is required to compress the gaseous fuel in a fuel manifold. The mass of fuel delivered to the manifold is no longer solely dependent on the volume that is pumped in. Improved mass-flow scheduling is needed to achieve the desired thrust response times without the risk over fueling, which can lead to instability. Therefore, a feedback mechanism, such as provided herein with respect to system 200, is needed to address the compressibility of gaseous fuel to achieve performance/response similar to traditional liquid fuel.

In certain embodiments, referring to FIG. 1, an aircraft 1 can include an engine 100, where the engine can be a propulsive energy engine (e.g. creating thrust for the aircraft 1), or a non-propulsive energy engine, and a fuel system 100. As described herein, the engine 100 is a turbofan engine, although the present technology may likewise be used with other engine types. The engine 100 includes a compressor section 102 having a compressor 104 in a primary gas path 106 to supply compressed air to a combustor 108 of the aircraft engine 100, the primary gas path 106 including fluidly in series the combustor 108 and nozzle manifold 110 for issuing fluid to the combustor 108.

The primary gas path 106 includes, in fluid communication in a series: the compressor 104, the combustor 108 fluidly connected to an outlet 114 of the compressor 104, and a turbine section 116 fluidly connected to an outlet 118 of the combustor 108. The turbine section 116 is mechanically connected to the compressor 104 to drive the compressor 104.

The combustor 108 includes a plurality of fuel nozzles 120 each fluidly connected via a fuel flow conduit 122 which feeds the plurality of fuel nozzles 120 of the combustor 108 with a gaseous fuel supply 124. The fuel flow conduit 122 includes an inlet end 126 and an outlet end 128 to fluidly connect the gaseous fuel supply 124 to the combustor 108 through the plurality of fuel nozzles 120. In embodiments, the gaseous fuel supply 124 can be any suitable gaseous fuel, such as a gaseous pressure and/or temperature regulated fuel supply, which may be or include liquid hydrogen converted to hydrogen gas.

Certain additional components may also be included in fluid communication between the combustor 108 and the gaseous fuel supply 124 in any suitable order or combination, such as a fuel shut off valve 130, a fuel pump 132, a liquid/gaseous fuel evaporator 134, a turbine air cooling heat exchanger 136, a gaseous fuel accumulator 138, a gaseous fuel metering unit 140, and/or a fuel manifold shut off valve 142.

A fuel control system 200, shown in FIG. 2, can be included in the engine 100 of FIG. 1 for controlling flow of gaseous fuel in the fuel flow conduit 122 from the fuel source 124 to the combustor 108. The system 200 includes a control module 144 operatively connected to a metering device 146 (which may be integral with or part of the metering unit 140 of FIG. 1) in the fuel flow conduit 122 to control the flow of fuel through the fuel flow conduit 122. The metering device 146 can be any suitable metering device, such as a valve on a pressurized line (e.g. as shown), a pump, or the like. The control module 144 includes an input line 148 operable to receive a command input 150 indicative of a requested engine state, e.g. a command from a pilot, autopilot, or drone software for acceleration of the engine 100.

With continued reference now to FIG. 2, in embodiments, the control module 144 includes machine readable instruction configured to cause the control module 144 to receive a plurality of inputs and cause the control module 144 to control the metering device 146 based on the plurality of inputs to achieve the desired command input 150 for the requested engine state.

A first input can be from a compressibility logic 152 configured to output a compressibility factor 154 to the control module 144. In embodiments, the compressibility logic 152 includes a compressibility schedule, where a compressibility gain is correlated to a system pressure measurement. The compressibility logic 152 is thus operable to output the compressibility gain for a measured P3 pressure as the compressibility factor 154 used as an input to the control module 144. Embodiments may include pressure measurements gathered by a pressure sensor capable of measuring gaseous pressure at, or near the fuel manifold or a fuel supply pressure, for example, or at a P3 stage. Embodiments may include pressure feedback sensors capable of operating in the high pressure and temperature environment of the combustor (e.g. P3), for example.

A predictive logic module 156 is configured to output a predictive logic gain value 158 as input to the control module 144. In certain embodiments, the predictive logic module 156 can be at least one of a proportional-integral, proportional-derivative, and/or proportional-integral-derivative (PID) controller, however any suitable predictive logic controller may be used.

The predictive logic module 156 includes logic operable to output a predictive logic gain value 158 (e.g. a PID gain) as input to the control module 144, where the predictive logic gain value 158 is dependent upon a proportional value 160 representative of one or both of a measured engine speed, or a difference between the measured engine speed and a requested engine speed needed to achieve the requested engine state. In embodiments, the predicative logic gain value 158 may additionally or alternatively be dependent on a derivative value 162 representative of a calculated derivative of measured engine speed. In embodiments, the predictive logic gain value 158 may additionally or alternatively be dependent upon an integral value 164 representative of an integral of measured engine speed over a given period of time.

A third input includes a feedback logic 166 configured to output a feedback factor 168 to the control module 144, based on a conventional fuel flow schedule (e.g. for liquid fuel) for the given engine. The feedback logic 166 is configured to receive input indicative of an ambient condition and/or an engine condition, where the engine condition can be representative of at least one of: engine start-up, increase in thrust, decrease in thrust, and/or change in engine power extraction, or the like. The feedback logic 166 can then account for the ambient and/or engine condition in achieving the requested engine state, and output the feedback factor 168 (e.g. a requested liquid fuel flow based on the fuel schedule) to the control module 144.

In certain embodiments, the feedback logic 166 can utilize any number of measurements gathered throughout the engine 100. For example, pressure feedback measurements could be sensed along the various stages of the compressor such as P2.5, P2.8 and P3. Other measurements may also be considered for the feedback element, for example including but not limited to, engine temperatures, fuel pressures and temperatures, other engine parameters such as speed and acceleration, and ambient conditions. Embodiments may include measurements gathered by a flow-meter capable of measuring gaseous mass-flow at, or near the fuel nozzle, for example. Embodiments may include pressure feedback sensors capable of operating in the high-temperature environment of the combustor (e.g. P4), for example.

The control module 144 includes an output line 170 operable to output a signal for a gaseous fuel flow request 172 to the metering device 146 to control the metering device 146 to achieve the commanded engine state based on the combined signal from the feedback factor 168 as modified by the compressibility factor input 154 and the PID gain input 158. It is contemplated that certain embodiments may include the system 200, where the system 200 may be operable to control the metering device 146 to achieve to achieve the commanded engine state, while including only the compressibility logic 152 and feedback logic 166, or only the predictive logic module 156 and the feedback logic 166, or any suitable combination thereof, without departing from the scope of this disclosure.

In accordance with yet another aspect of this disclosure, there is provided a method for controlling gaseous fuel in an aircraft (e.g. engine 100 of aircraft 1). In embodiments, the method includes receiving a gaseous fuel flow request input (e.g. based on a requested engine state and a feedback factor 168), receiving a proportional-integral-derivative (PID) gain input (e.g. PID gain 158), receiving a compressibility factor input (e.g. compressibility factor 154), and controlling a metering device (e.g. metering device 146) to achieve a commanded engine state based on the fuel flow request input, the PID gain input, and the compressibility factor input.

The methods and systems of the present disclosure, as described above and shown in the drawings, provide for updated fuel flow control software having both a predictive element (which may be based on, but not limited to, engine parameters such as speed and acceleration, ambient conditions, and requested engine state) and a feedback element to compensate for the compressibility of gaseous fuel to achieve engine response times while avoiding surges, overshoots, and the like.

In a conventional liquid fuel engine, the look-up table (i.e. fuel schedule) contains fuel-flow targets based on engine speed and altitude, however these look-up tables are not suitable for gaseous fuels. Accordingly, the feedback element may be a pressure measurement in the cold-section of the engine such as at the high pressure compressor (HPC) outlet, P3. The system's predictive aspect is to be based on engine speed. A software gain can then be applied to the fuel schedule based on derivatives/integrals (i.e. a PID loop) of the measured engine speed.

The fuel flow control software as described herein will update to be used whenever a change in fuel flow is requested (e.g. at engine start-up, changes in thrust & for changes of engine power-extraction.) The systems and methods provided herein address the fuel scheduling challenges for compressible (i.e. gaseous) fuels, which currently are not accounted for in the conventional incompressible liquid fuel-flow scheduling traditionally used in aircraft engines.

Thus, embodiments include the use of described feedback and/or predictive elements. However, in some embodiments, the feedback and/or predictive elements may be optional by instead developing complex, model-based software to factor compressibility into the fuel schedule. This software could be developed using physics modeling or empirical data.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

For example, the following particular embodiments of the present technology are likewise contemplated, as described herein next by clauses.

Clause 1. A fuel control system (200) for gaseous fuel in an aircraft (1), comprising:
    a control module (144) operatively connected to a metering device (146) in a fuel flow conduit (122) operable to control flow of fuel through the fuel flow conduit, wherein the control module includes an input line (148) operable to receive a command input (150) indicative of a requested engine state, wherein the control module includes:
    a compressibility logic (152); and
    machine readable instructions configured to cause the control module to control the metering device to achieve the requested engine state based on a compressibility factor (154) input from the compressibility logic.

Clause 2. The system as recited in clause 1, wherein the control module further includes:
a predictive logic module (156); and
machine readable instructions operable to cause the control module to control the metering device to achieve the requested engine state based on the compressibility logic and results (158) from the predictive logic module.

Clause 3. The system as recited in clause 2, wherein the predictive logic module is at least one of a: proportional-integral, proportional-derivative, and/or proportional-integral-derivative (PID) controller.

Clause 4. The system as recited in clause 3, wherein the predictive logic module includes logic operable to output a predictive logic gain value (158) to the control module, wherein the predictive logic gain value is dependent upon a proportional value representative of a measured engine speed, or a difference between the measured engine speed and a requested engine speed needed to achieve the requested engine state.

Clause 5. The system as recited in clause 3, wherein the predictive logic module includes logic operable to output a predictive logic gain value (158) to the control module, wherein the predicative logic gain value is dependent upon a derivative value representative of a calculated derivative of measured engine speed.

Clause 6. The system as recited in clause 3, wherein the predictive logic module includes logic operable to output a predictive logic gain value (158) to control the control module, wherein the predictive logic gain value is dependent upon an integral value representative of an integral of measured engine speed over a given period of time.

Clause 7. The system as recited in clause 1, further comprising:
a feedback logic (166) configured to:
receive input indicative of an ambient and/or an engine condition;
account for the ambient and/or engine condition in achieving the requested engine state; and
output a feedback factor (168) to the control module; and
machine readable instructions operable to cause the control module to control the metering device to achieve the requested engine state based on the feedback factor.

Clause 8. The system as recited in clause 7, wherein the engine condition includes at least one of engine start-up, increase in thrust, decrease in thrust, and/or change in engine power extraction.

Clause 9. The system as recited in clause 1, wherein the compressibility logic includes a compressibility schedule, wherein a compressibility gain is correlated to a system pressure measurement, wherein the compressibility logic is operable to output the compressibility gain as the compressibility factor to the control module.

Clause 10. A fuel control system (100) for gaseous fuel in an aircraft (1) comprising:
a control module (144) operatively connected to a metering device (146) in a fuel flow conduit (122) for controlling flow of fuel through the fuel flow conduit, wherein the control module includes an input line (148) for receiving a command input (150) indicative of a requested engine state, wherein the control module includes:
a predictive logic module (156); and
machine readable instructions configured to cause the control module to control the metering device to achieve the requested engine state based on results (158) from the predictive logic module.

Clause 11. The system as recited in clause 10, wherein the predictive control logic module is at least one of a: proportional-integral, proportional-derivative, and/or proportional-integral-derivative (PID) controller.

Clause 12. The system as recited in clause 11, wherein the predictive logic module includes logic operable to output a predictive logic gain (158) value to the control module, wherein the predictive logic gain value is dependent upon a proportional value representative of a measured engine speed, or a difference between the measured engine speed and a requested engine speed needed to achieve the requested engine state.

Clause 13. The system as recited in clause 11, wherein the predictive logic module includes logic operable to output a predictive logic gain value (158) to the control module, wherein the predicative logic gain value is dependent upon a derivative value representative of a calculated derivative of measured engine speed.

Clause 14. The system as recited in clause 11, wherein the predictive logic module includes logic operable to output a predictive logic gain value (158) to control the control module, wherein the predictive logic gain value is dependent upon an integral value representative of an integral of measured engine speed over a given period of time.

Clause 15. The system as recited in clause 11, further comprising:
a feedback logic (166) operable to:
receive input indicative of an ambient and/or an engine condition;
account for the ambient and/or engine condition in achieving the requested engine state; and
output a feedback factor (168) to the control module; and
machine readable instructions operable to cause the control module to control the metering device to achieve the requested engine state based on the feedback factor.

Clause 16. A method for controlling gaseous fuel in an aircraft (1), comprising:
receiving a gaseous fuel flow request input;
receiving a proportional-integral-derivative (PID) gain input (158);
receiving a compressibility factor input (154); and
controlling a metering device (146) to achieve a commanded engine state based on the fuel flow request input, the PID gain input, and the compressibility factor input.

Clause 17. The method as recited in clause 16, wherein the fuel flow request input is based on a requested engine state and feedback measurements.

What is claimed is:
1. A method for controlling gaseous fuel in an aircraft, the aircraft comprising:
an aircraft engine comprising:
a primary gas path including, in fluid communication and in series:
a compressor:
a combustor fluidly connected to an outlet of the compressor; and
a turbine section fluidly connected to an outlet of the combustor, the compressor supplying compressed air to the combustor:

a pressure sensor operable to gather a pressure measurement of a pressure in the primary gas path at or upstream of the combustor;
a fuel control system including:
a metering device in a fuel flow conduit operable to control flow of a gaseous fuel through the fuel flow conduit and to the combustor;
a computer-readable medium storing:
feedback logic operable to account for an ambient condition and/or an engine condition in achieving a requested engine state, and output a liquid fuel flow request based on a fuel flow schedule for liquid fuel;
predictive logic operable to output a predictive logic gain dependent upon a measured engine speed of the aircraft engine; and
compressibility logic operable to output a compressibility gain correlated to the pressure measurement of the pressure in the primary gas path at or upstream of the combustor; and
a control module operatively connected to the metering device, wherein the control module includes an input line operable to receive a command input indicative of the requested engine state, wherein the control module is configured to:
receive the liquid fuel flow request from the feedback logic;
receive the predictive logic gain from the predictive logic;
receive the compressibility gain from the compressibility logic;
generate a gaseous fuel flow request by modifying the liquid fuel flow request based on the compressibility gain and the predictive logic gain; and
control the metering device to achieve the requested engine state based on the gaseous fuel flow request,
the method comprising:
receiving a proportional-integral-derivative (PID) gain input at the control module;
receiving a compressibility factor input at the control module;
generating the gaseous fuel flow request using the control module; and
controlling the metering device to achieve the commanded engine state based on the generated gaseous fuel flow request.

2. An aircraft engine comprising:
a primary gas path including, in fluid communication and in series:
a compressor;
a combustor fluidly connected to an outlet of the compressor; and
a turbine section fluidly connected to an outlet of the combustor, the compressor supplying compressed air to the combustor;
a pressure sensor operable to gather a pressure measurement of a pressure in the primary gas path at or upstream of the combustor;
a fuel control system including:
a metering device in a fuel flow conduit operable to control flow of a gaseous fuel through the fuel flow conduit and to the combustor;
a computer-readable medium storing:
feedback logic operable to account for an ambient condition and/or an engine condition in achieving a requested engine state, and output a liquid fuel flow request based on a fuel flow schedule for liquid fuel;
predictive logic operable to output a predictive logic gain dependent upon a measured engine speed of the aircraft engine; and
compressibility logic operable to output a compressibility gain correlated to the pressure measurement of the pressure in the primary gas path at or upstream of the combustor; and
a control module operatively connected to the metering device, wherein the control module includes an input line operable to receive a command input indicative of the requested engine state, wherein the control module is configured to:
receive the liquid fuel flow request from the feedback logic;
receive the predictive logic gain from the predictive logic;
receive the compressibility gain from the compressibility logic;
generate a gaseous fuel flow request by modifying the liquid fuel flow request based on the compressibility gain and the predictive logic gain; and
control the metering device to achieve the requested engine state based on the gaseous fuel flow request.

3. The aircraft engine as recited in claim 2, comprising at least one of a: proportional-integral, proportional-derivative, and/or proportional-integral-derivative (PID) controller for generating the predictive logic gain.

4. The aircraft engine as recited in claim 3, wherein the predictive logic gain is dependent upon a proportional value representative of the measured engine speed, or a difference between the measured engine speed and a requested engine speed needed to achieve the requested engine state.

5. The aircraft engine as recited in claim 3, wherein the predicative logic gain is dependent upon a derivative value representative of a calculated derivative of the measured engine speed.

6. The aircraft engine as recited in claim 3, wherein the predictive logic gain is dependent upon an integral value representative of an integral of the measured engine speed over a given period of time.

7. The aircraft engine as recited in claim 2, wherein;
the engine condition includes at least one of engine start-up, increase in thrust, decrease in thrust, and/or change in engine power extraction.

8. The aircraft engine as recited in claim 2, wherein: the pressure measurement is of a pressure in the primary gas path at the outlet of the compressor.

* * * * *